United States Patent [19]

Veazey

[11] Patent Number: 4,497,272
[45] Date of Patent: Feb. 5, 1985

[54] MASTLESS SAILS

[76] Inventor: Sidney E. Veazey, Box 497, Rte. 2, Fredericksburg, Va. 22401

[21] Appl. No.: 383,673

[22] Filed: Jun. 1, 1982

[51] Int. Cl.³ .............................................. B63H 9/06
[52] U.S. Cl. ..................................... 114/103; 114/39; 244/32
[58] Field of Search ......................... 114/39, 102, 103; 244/33, 116, 133, 32

[56] References Cited

U.S. PATENT DOCUMENTS

| 3,521,836 | 7/1970 | Struble, Jr. | 244/116 |
| 3,957,228 | 5/1976 | Kennedy, Jr. | 244/33 |

FOREIGN PATENT DOCUMENTS

| 1543337 | 6/1975 | France | 114/102 |
| 2372077 | 7/1978 | France | 114/103 |
| 2479127 | 10/1981 | France | 114/39 |
| 2482553 | 11/1981 | France | 114/102 |
| 2055049 | 2/1981 | United Kingdom | 244/133 |
| 2098946 | 12/1982 | United Kingdom | 114/39 |

Primary Examiner—Trygve M. Blix
Assistant Examiner—Edwin L. Swinehart
Attorney, Agent, or Firm—R. F. Beers; L. A. Marsh

[57] ABSTRACT

Mastless sails for a boat or ship which comprise sails having capability for utilizing static and dynamic lift in combination with drag, gravity, and line tension to provide stability and propulsion forces for the boat or ship, communication capability located near said sails when aloft for use for said boat or ship, sensing capability located near said sails when aloft for use by said boat or ship, and apparatus for raising and lowering the communication and sensing apparatus.

4 Claims, 13 Drawing Figures 4,497,272

MASTLESS SAILS

BACKGROUND OF THE INVENTION

1. Field of the Invention

This invention relates to mastless sails for a boat or ship for propulsion, as well as, sensing systems located near said sail when said sail is aloft. More particularly the sensing systems include antenna systems for optical, radar, television, electronic counter measure, communication systems and solar photo voltaic systems.

2. Description of the Prior Art

The prior art illustrates many and various types of sails for many varied uses. Specific styles for a circularly hulled vessel are illustrated in U.S. Pat. No. 3,371,636. Specific curvature and aerodynamic cells or panels for sails are illustrated in U.S. Pat. No. 3,851,612. And, U.S. Pat. No. 4,044,702 illustrates a high efficiency aerodynamic sail system for boats. An adjustable spinnaker header and rig therefore is illustrated in U.S. Pat. No. 4,164,193 for obtaining the ultimate use in driving a boat hull at its maximum speed during race events. And, U.S. Pat. No. 4,178,867 illustrates attaching a rescue signal device to a signal balloon which can float in the air high above the boat when the balloon is inflated with hydrogen in an emergency. And, an improved spinnaker which is lighter-than-air, using hydrogen, helium, and heated air, and designed to float ahead of the boat and to retain its shape when subject to wind variations is illustrated in U.S. Pat. No. 4,296,704.

SUMMARY OF THE INVENTION

In accordance with the invention the novel and unique mastless sail for a boat or ship comprises sail means for utilizing static and/or dynamic lift in combination with drag, gravity, and line tension to provide stability and propulsion forces for the boat or ship, communication means located near said sail means when aloft for use for said boat or ship, sensing means located near said means when aloft for use by said boat or ship, and means for raising and lowering said antenna means and said sensing means.

STATEMENT OF THE OBJECTS OF THE INVENTION

An object of the invention is to provide power boats, sailboats, life boats, and ships with or without masts for sailing, a simple, efficient and cost-effective means of propulsion, antenna, and sensing systems.

Another object of the invention is to provide several mastless sail systems for utilizing static and/or dynamic lift which in combination with the drag, gravity, and line tension, stability and useful propulsion forces to a boat or ship.

Yet another object of the invention is to provide a mastless sail system for a boat or ship not equipped with a mast for sailing that is easily stowable and inexpensive that is useful as auxiliary and/or emergency means of propulsion and signaling or communications.

Still another object of the invention is to provide a mastless sail system for a boat or ship that can be raised several hundred feet into winds that are stronger for auxiliary and/or emergency means of propulsion and signaling or communications.

DESCRIPTION OF THE VARIOUS EMBODIMENTS

Figure 1:
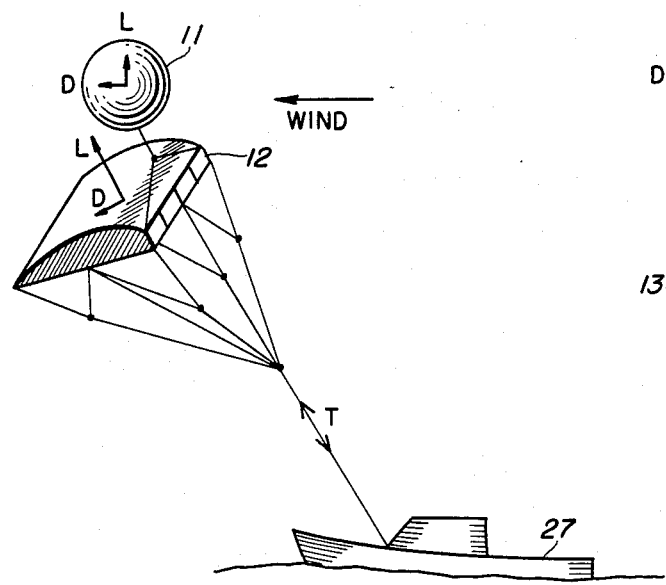
FIG. 1 shows how lift and drag of a balloon and parafoil combine to provide tension to move the boat or ship forward in one embodiment of the invention.
Figure 2:
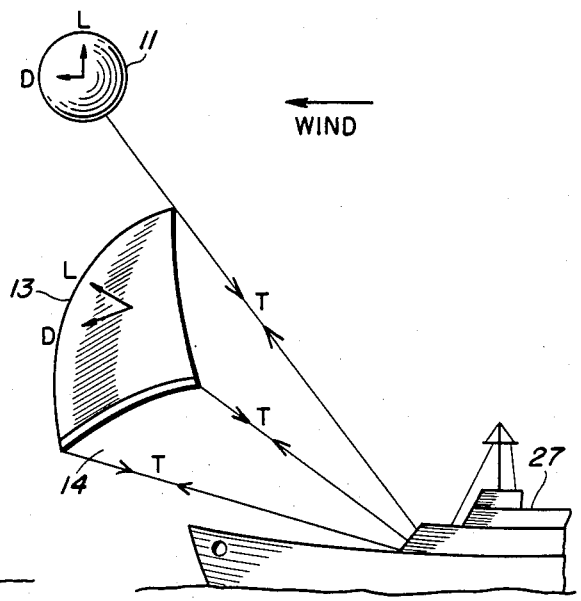
FIG. 2 illustrates how the spinnaker is hoisted to heights where stronger winds exist in another embodiment of the invention.
Figure 3:
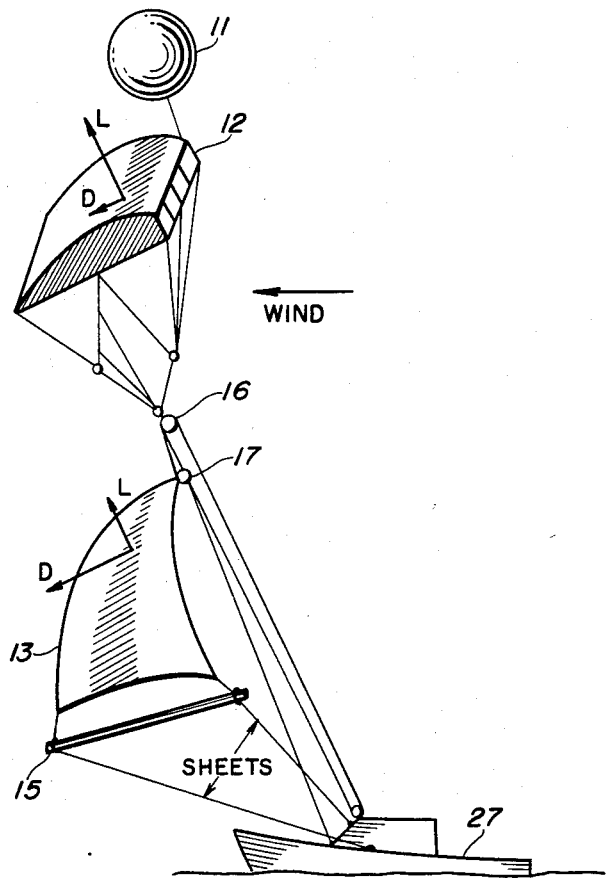
FIG. 3 shows the tremendous pull associated with a Jalbert type parafoil to provide lift for the spinnaker; and, a block or pulley below the parafoil, illustrates that antenna and sensors, as well as the spinnakers can be hoisted from the deck as required or desired as another embodiment of the invention.
Figure 4:
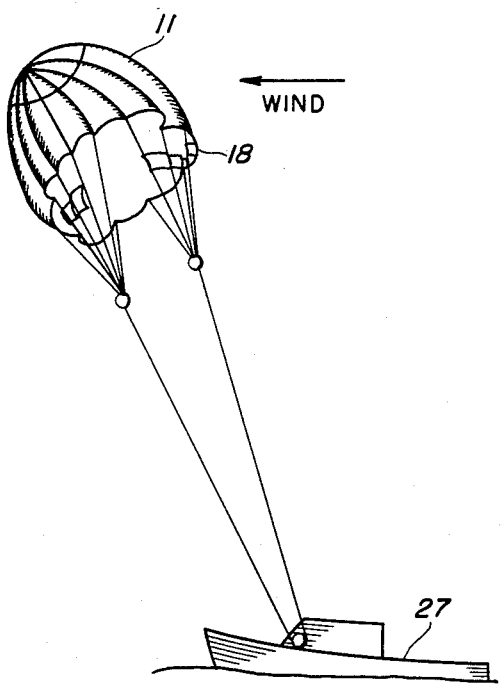
FIG. 4 illustrates a steerable parachute of the circular or rectangular parafoil or sport chute variety can be raised with the assistance of a separate or attached balloon to provide a downwind pull or propulsion for the vehicle as another embodiment of the invention.
Figure 5:
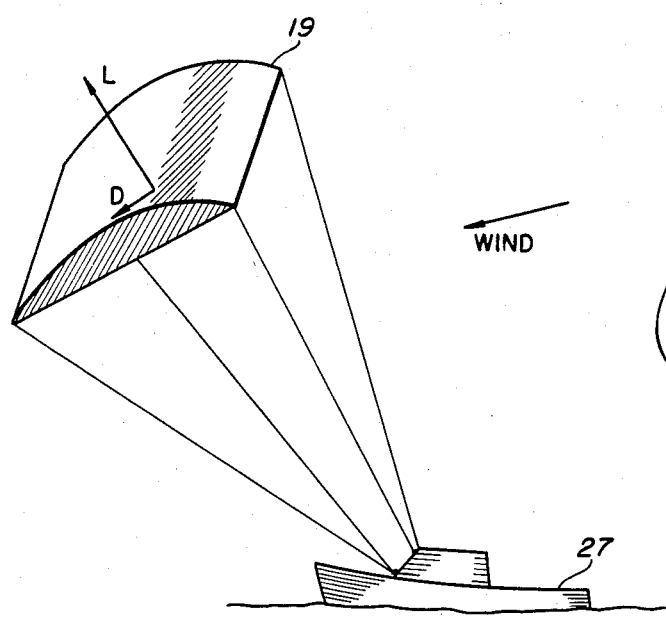
FIG. 5 shows a large Jalbert parafoil, wing-shaped balloon, or combination balloon and parafoil with some open cells and some balloon cells with He or $H_2$ to provide the lift and drag for propulsion as required in another embodiment of the invention.
Figure 6:
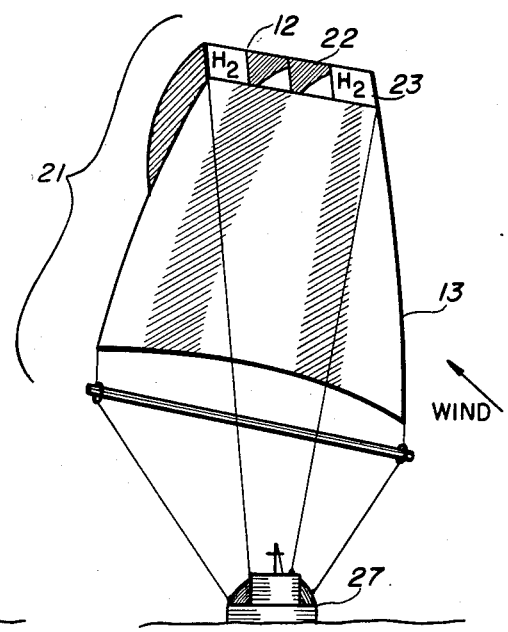
FIG. 6 illustrates a combination of a balloon, kite, and sail, or a Jalbert parafoil with some cells filled with He or $H_2$ joined to the top of a truncated spinnaker for use in control assistance in another embodiment of the invention.
Figure 7:
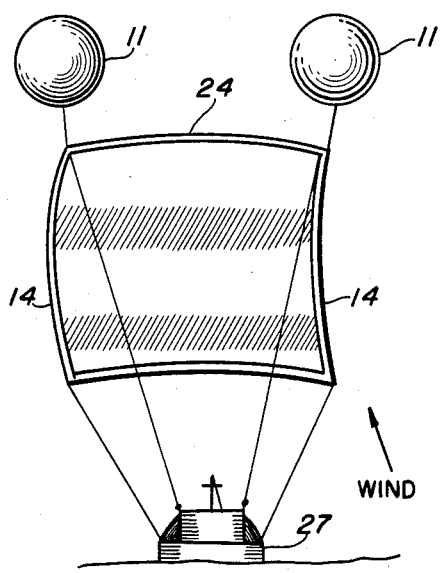
FIG. 7 shows a square sail with lightweight batten stiffeners being lifted by balloons in another embodiment of the invention.
Figure 8:
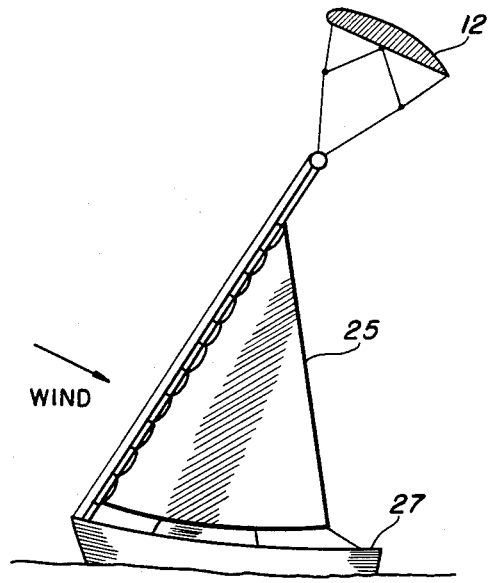
FIG. 8 shows the possibility of sailing on a close reach wherein the parafoil line is at an angle somewhat aft and to the leeward side of the boat and a jib sail is hoisted on the parafoil halyard and as the lift from the jib overcomes the drag from the parafoil. jib, and boat, the boat goes forward in another embodiment of the invention.
Figure 9:
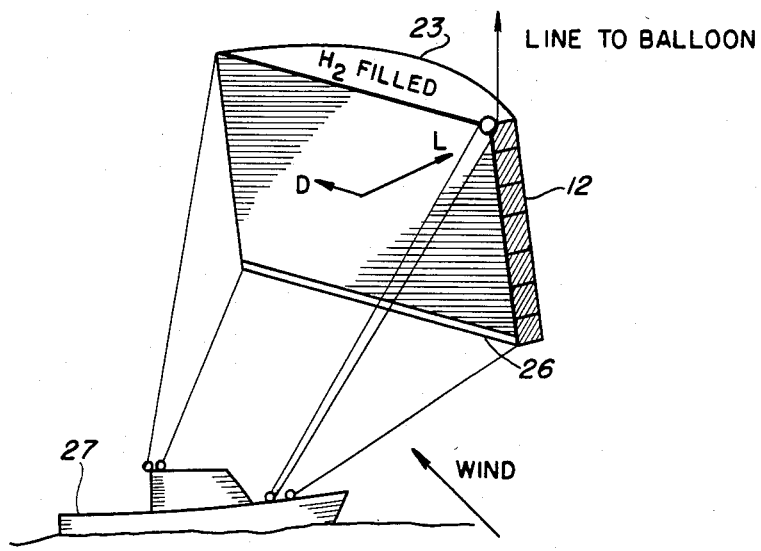
FIG. 9 illustrates another example of the invention allowing a vessel to sail with the wind forward of the beam in another embodiment of the invention.

The present invention may be readily understood by referring to the various drawings wherein mastless sail(s) for propulsion, recognition, or height for photography, televison, radar, solar cell electricity generation, electronic counter measures, and communications are illustrated. FIG. 1 shows the lift (L) and drag (D) of a balloon 11 and parafoil 12 combined to provide tension to move the boat or ship 27 forward. Spinnaker 13 illustrates in FIG. 2 how it is hoisted to heights where stronger winds exist. Batten stiffener 14, located at the foot of spinnaker 13 is trimmed by the starboard and port sheets when the wind is on the beam or quarter to allow spinnaker 13 an aerodynamic shape to provide lift in the forward direction. And, by easing both sheets, spinnaker 13 provides a component of lift in the upward direction that assists in keeping spinnaker 13 aloft. Tremendous vertical pull associated with the Jalbert parafoil to provide lift for spinnaker 13 is illustrated in FIG. 3. Spinnaker 13 is trimmed by adjusting trimming pole 15 forward and aft in relation to the head of spinnaker 13 and the angle of the trimming with respect to the longitudinal axis of boat 27. Block or pulley 16, located below parafoil 12 is utilized for hoisting antenna, sensor packages, radar antenna and reflectors, electronic counter measures, antenna television cameras, etc. up from the deck. A steerable parachute 18 or the circular or rectangular parafoil 12 or sport chute is illustrated in FIG. 4 for providing a downwind pull and is raised with the assistance of a separate or attached balloon 11 filled with He or $H_2$. A large Jalbert parafoil 12, or combination balloon 11 and parafoil 12 with some open cells 22 and some filled balloon cells 23 filled with He or $H_2$ provides lift and drag for propulsion is shown in FIG. 5. Separate balloon 11 can be used to provide additional lift as necessary. FIG. 6 illustrates a Jalbert parafoil 12 with some open cells 22 and filled cells 23 with He or $H_2$ where desired joined to the top of a truncated spinnaker 13 which overall yields a wing-shaped balloon 21. A separate balloon 11 can be used to provide additional lift if necessary. Lines to the stiffners and trimming pole adjust the lift and trim (vertical angle of attack and horizontal angle of the sail to the wind respectively). A square sail 24 with lightweight batten stiffeners 14 being lifted by balloons 11 filled with He or $H_2$ is illustrated in FIG. 7. Heavier battens 14 are used for stronger winds. And, as illustrated in previous FIGS. the sails horizontal and vertical lift components are adjusted by the lines. The antenna and sensing means are also readily hoisted to near the sail means for use as required. FIG. 8 illustrates the possibility of sailing on a close reach. Parafoil 12 line is located at an angle somewhat aft and to the leeward side of boat 27, much as is the headstay when a small boat is on a close reach. A jib sail 25 is hoisted on the parafoil 12 halyard, and, when the lift from jib sail 25 overcomes the drag from parafoil 12, jib 25, and boat 27, boat 27 will go forward. In another embodiment of the invention allowing a vessel to sail with the wind close to the beam is shown in FIG. 9. First, a Jalbert parafoil 12 is flown substantially vertically of a balloon/Jalbert parafoil/wing on edge. The top portion 23 of parafoil 12 on edge is filled with $H_2$ or He. Heavier battens 26 are used and a weight is added, as necessary, to keep the leading edge substantially vertical. Such a parafoil 12 wing on edge is trimmed with the lines and provides forward motion into the wind.

Figure 10:
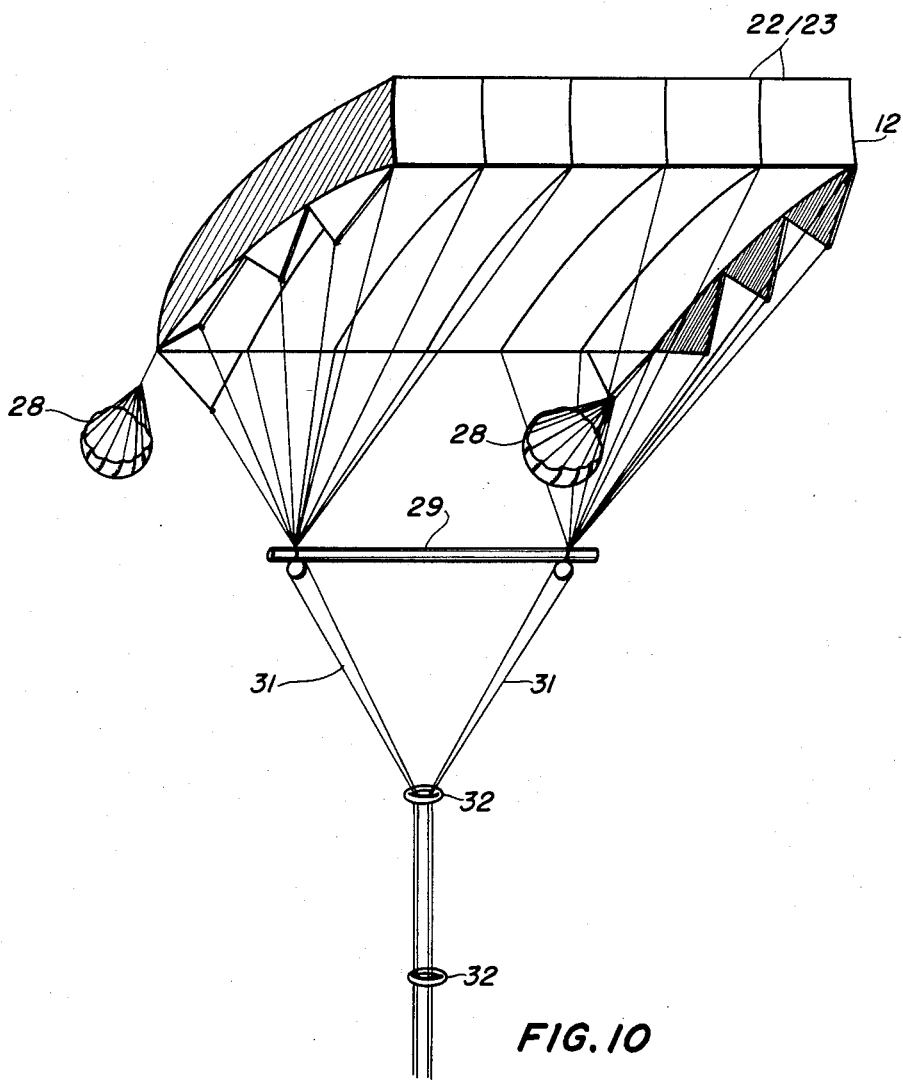
FIG. 10 illustrates another embodiment similar to FIGS. 1 and 3 wherein trailing chutes are utilized to assist in stability, a spreader bar is used to give parafoil slight dihedral to increase stability, along with two separate control lines leading from ends of spreader bar to boat for increasing control. Rings are used for control lines to allow the parafoil to be flown to right or left of wind direction.

FIG. 10 illustrates a variation of applicant's invention similar to FIGS. 1 and 3 wherein trailing chute(s) 28 are utilized as a stabilizer, spreader bar 29 is utilized as shown to yield a slight dihedral effect to parafoil 12 which may have open cells 22 in order to further increase stability. Halyard 17 also, in this modification as illustrated, is preferably split into separate control lines 31 located just below spreader bar 29 for assist in overall control. Said lines 31 are also preferably contained within rings 32 as shown to allow parafoil 12 to be flown to either the right or left of wind direction.

Figure 11:
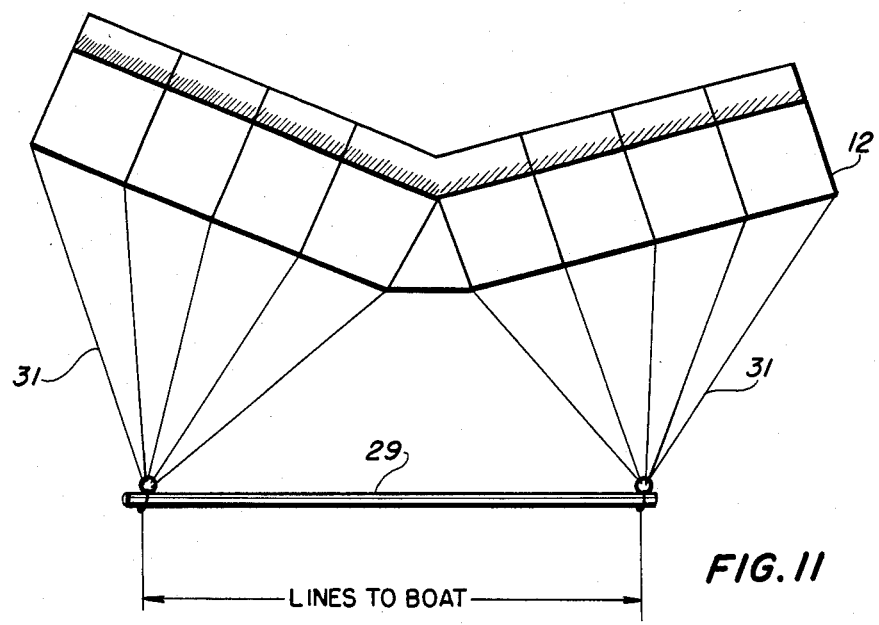
FIG. 11 is a front view of parafoil showing dihedral angle to enhance stability.
Figure 12:
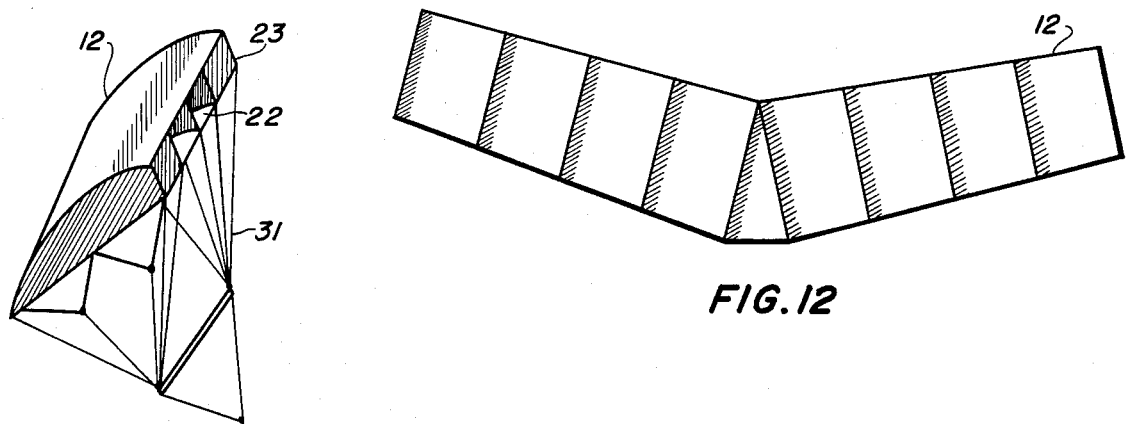
FIG. 12 is a top view of parafoil as in FIG. 10 showing swept back wings for enhancing stability.

FIGS. 11 and 12 illustrate modifications to parafoil 12 to obtain dihedral angle for stability enhancement.

Figure 13:
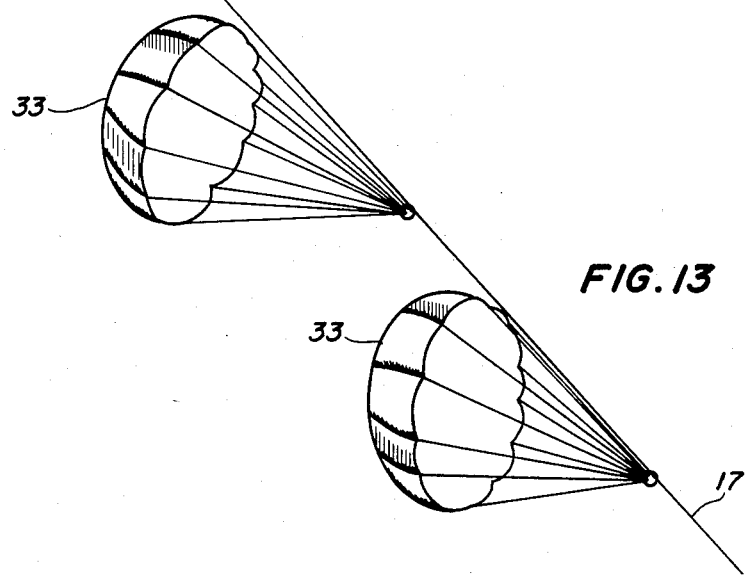
FIG. 13 shows a parafoil with parachutes attached to the halyard to produce additional lift.

FIG. 13 illustrates utilization of parachute(s) 33 attached to halyard 17 to produce additional lift as required.

In general, boats and ships are able to steer courses somewhat off the direction of the wind using the rudder, the propeller at slow speed, and/or with the assistance of lee boards or an increase of rudder surface area.

The lightweight package of sensors can be raised even if it is not desired to use the system for propulsive power by utilizing the mastless sails of the invention. The propulsion, signalling or communication capability and visual recognition enhancement of the invention utilizing the international orange parafoil/spinnaker can potentially save many lives. Moreover, in view of their lightweight, sensor packages of lightweight microelectronics, using fiber optic transmission lines, kevlar lines; radio and radar antennas, electro magnetic sensing devices, video cameras, and decoys can be raised into any of the various balloons, kites, parachutes, parafoils, sail and wind like structures depicted herein to an altitude of several hundred feet for greatly improved efficiency in accordance with the invention. The antenna means is preferably omni directional, however, directional control types can readily be used through controlled movement relative to a wind direction vane attached to said sensing means package.

Obviously many modifications and variations of the present invention are possible in light of the above teachings. It is therefore to be understood that within the scope of the appended claims the invention may be practiced otherwise than as specifically described.

What is claimed is:

1. A mastless sail for a boat or ship comprising:
    said means consisting of a balloon, parafoil and spinnaker for utilizing static and dynamic lift in combination with drag, gravity, and line tension to provide stability and propulsion forces for the boat or ship;
    communication means located near the sail means when the sail means is aloft for use by the boat or ship;
    sensing means located near the sail means when the sail means is aloft for use by the boat or ship; and
    raising and lowering means for raising and lowering the communicating means and the sensing means.

2. A mastless sail for a boat or ship as in claim 1 wherein said balloon is filled with a lighter than air gas.

3. A mastless sail for a boat or ship as in claim 1 wherein said parafoil is a wing type structure having at least a portion thereof filled with a lighter than air gas.

4. A mastless sail for a boat or ship as in claim 1 wherein said parafoil is a steerable parafoil.

* * * * *